Dec. 21, 1965     TOSHIO KURIMURA ET AL     3,225,283
REGULABLE-OUTPUT RECTIFYING APPARATUS
Filed June 6, 1961     5 Sheets-Sheet 1
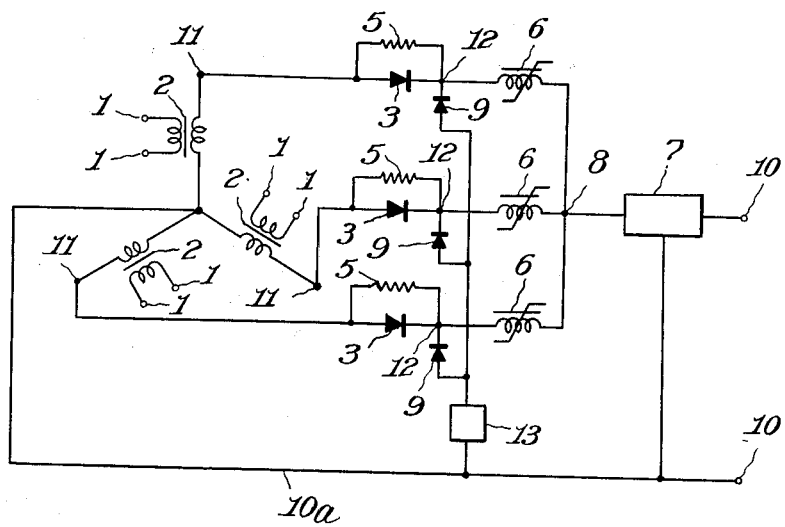
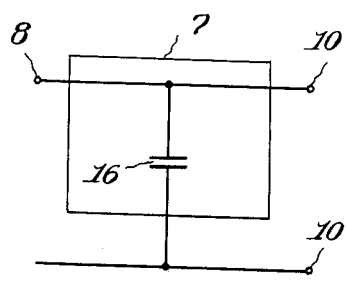
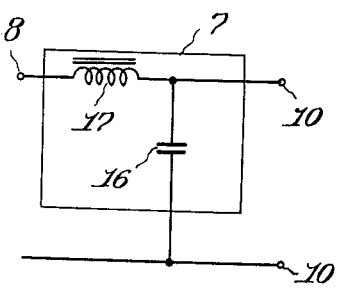

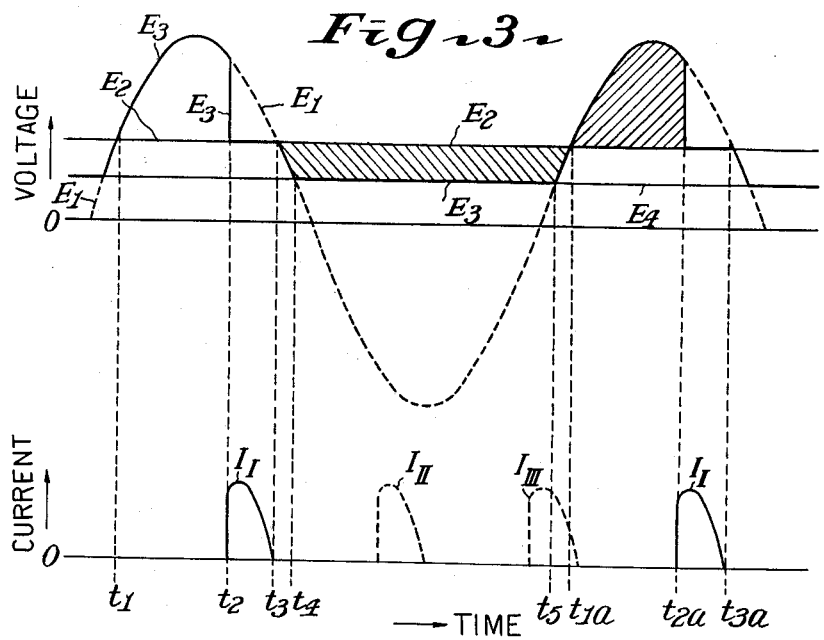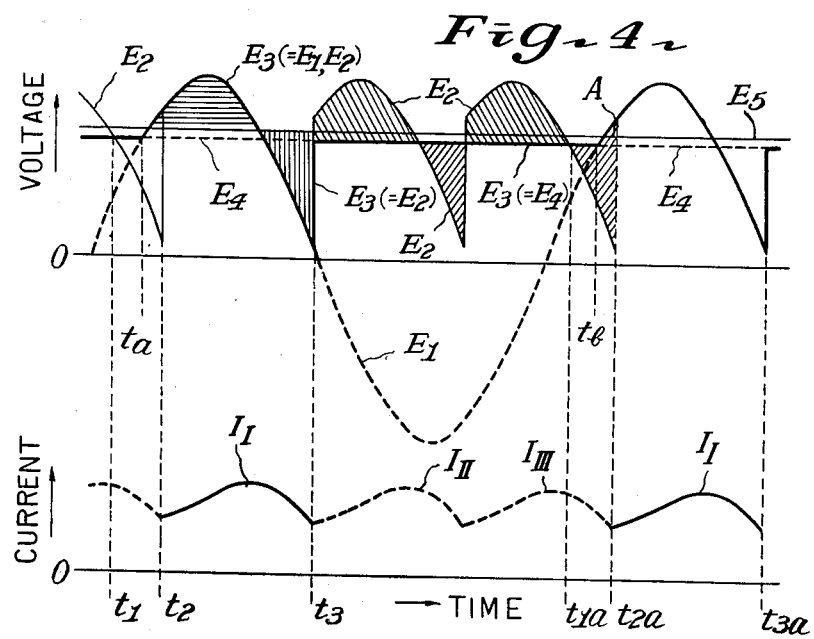

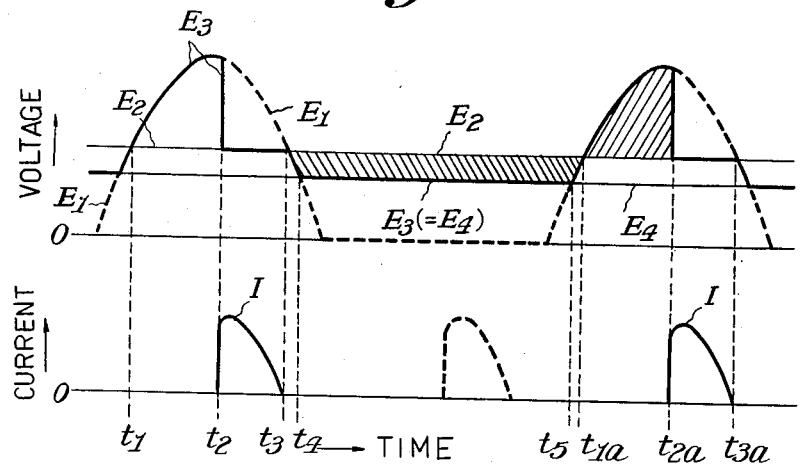

United States Patent Office 3,225,283
Patented Dec. 21, 1965

3,225,283
REGULABLE-OUTPUT RECTIFYING APPARATUS
Toshio Kurimura and Kazuomi Yamamura, Tokyo-to, Japan, assignors to Kokusai Denshin Denwa Kabushiki Kaisha, Tokyo-to, Japan, a joint-stock company of Japan
Filed June 6, 1961, Ser. No. 115,193
Claims priority, application Japan, June 9, 1960, 35/27,115, 35/27,116; Dec. 26, 1960, 35/50,226
4 Claims. (Cl. 321—16)

This invention relates to an alternating current voltage rectification system, and more particularly to an alternating current voltage rectifying apparatus wherein the rectifying output voltage can be electrically regulated.

More specifically, the invention relates to an alternating current voltage rectifying apparatus comprising saturable reactors, each of which has a substantially rectangular hysteresis characteristic. The number of reactors is equal to the number of terminals of an alternating current source the output of which is to be rectified. The reactors are used as the principal regulating elements for regulating a direct current output voltage of the rectifying apparatus, and the intensity of magnetization of the saturable reactors is regulated in common by voltage clamping circuits of low current capacity.

Conventional rectifying apparatuses comprise vacuum tubes for regulation connected, respectively, in series with ordinary rectifiers and the electric potentials of the control grids of the tubes are regulated, for example the control grids of mercury rectifiers and of thyratrons, etc. are employed as rectifying elements are varied in order to vary the rectified current flowing therethrough. Such systems, however, have disadvantages such as inefficiency due to large power loss, high price, inconvenience in handling, and narrow range of voltage at which regulation can be accomplished. Thus, such systems have not been practical. Accordingly, as a partial solution of these difficulties, a system has recently been proposed wherein a single reactor is inserted between one of the output terminals of a full-wave bridge rectifying circuit for rectifying a single phase alternating current voltage. A smoothing circuit smoothens out the direct current output. Regulation of the intensity of magnetization of the single reactor is accomplished by means of regulation tubes whose anode is connected to a connection junction between one terminal of the bridge circuit and the reactor and whose cathode is connected to the other output terminals of the bridge circuit.

This system, however, is limited to rectification of single phase alternating current. Moreover, unless the output direct current voltage is sufficiently higher than the mean value of the alternating current voltage to be rectified the regulation ability of the system cannot be fully utilized. Accordingly, the utilization of this system is extremely limited.

It is a principal object of the present invention to provide a rectifying apparatus capable of producing a regulative D.C. output voltage, which is not accompanied with the disadvantages mentioned above.

It is another object of the invention to provide an efficient rectifying apparatus capable of regulating the rectified direct current voltage over a wide range.

According to the present invention, a rectifying apparatus for obtaining a regulative direct current output from an alternating current comprises power supply means, rectifying means, regulating means and a smoothing circuit which acts as an output circuit. The rectifying means employed comprises a plurality of series-connected circuits, equal in number to the number of output terminals of the power supply means. Each circuit comprises a rectifier and a saturable reactor having a winding with one terminal thereof connected to a common junction with the reactors of the other circuits. In this case each of the rectifiers has a resistor connected in parallel therewith. Each rectifier is connected in the same polarity to a respective output terminal of the power supply means. The apparatus is regulated by regulating means comprising a plurality of rectifying elements and a direct current voltage source. Each of the rectifying elements is connected to the respective junction between the rectifier and the saturable reactor so that terminals of the same sense of said rectifiers and of the rectifying elements are connected to each other, and the remaining terminal of each of the rectifying elements is connected to one of the terminals of the direct current voltage source. The direct current source produces variable direct current voltage capable of varying the voltage of the regulative direct current output of the rectifying apparatus according to the invention.

A smoothing circuit, for example, of condenser imput type or of the choke input type, is connected between the common junction of the saturable reactors and a terminal of the direct current voltage source which is also connected to a common return.

The novel features of this invention are set forth with particularity in the appended claims. This invention, however, both as to its construction and operation together with further objects and advantages thereof, may best be understood by reference to the following description, taken in connection with the accompanying drawings, in which the same and equivalent parts are designated by the same reference numerals or letters, and in which:

FIG. 1 is an electrical schematic illustrative of one embodiment of the invention;

FIGS. 2A and 2B are schematics of output circuits which form one portion of the circuit in FIG. 1 according to the invention;

FIGS. 3 and 4 are wave form diagrams for explaining the principles and operation of the apparatus of the invention;

FIG. 9 is a wave form diagram for describing and illustrating the principle and operation of the embodiment shown in FIG. 8.

Figure 5:
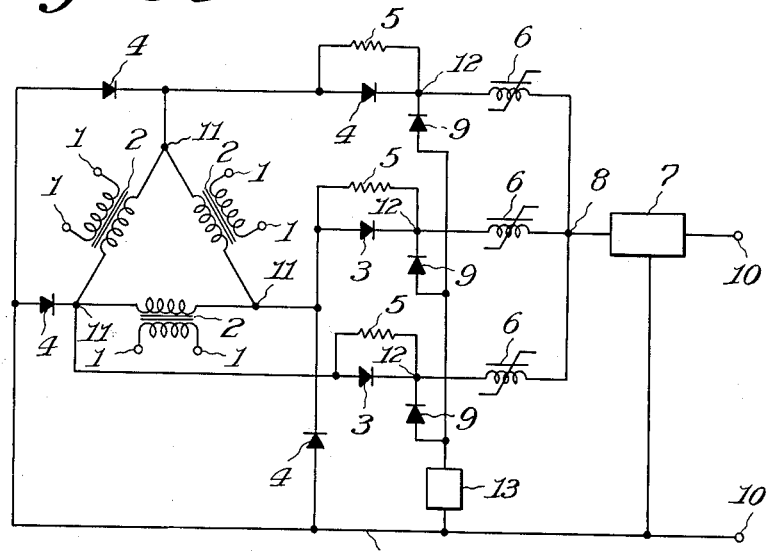
FIG. 5 is a schematic illustrating another embodiment of the invention.

Referring to FIG. 1, which illustrates a circuit arrangement wherein the present invention is applied to a halfwave circuit for rectifying a three-phase alternating current supplied from a Y connected transformer. The input side of the circuit is provided with imput terminals to a power transformer 2. By connecting a three-phase alternating current power source to these terminals 1, a voltage is supplied from the transformer 2 to the rectifiers 3. Resistors 5, which permit flow of magnetizing current for saturable reactors 6 during the period when inverse voltage is imparted to the rectifier 3, are used; and rectifier elements 9 and a direct current power source 13 for regulation constitutes a regulating circuit which prevents in the interval of cut-off condition of the corresponding rectifier 3, the voltage of the junctions of the rectifiers 3 and the saturable reactors 6 from becoming a voltage lower than the voltage of the power source 13. An output circuit 7 having output terminals 10 comprises a smoothing circuit and is connected to a common junction 8 of the three saturable reactors 6. For the output circuit 7, a circuit wherein only a smoothing condenser is used as indicated in FIG. 2A or a choke-input type circuit as indicated in FIG. 2B is used.

The operation of the circuit shown in FIG. 1 may be described with reference to FIG. 3, which shows a voltage wave form diagram. The one phase voltage of an output terminal 11 of the transformer 2 is represented in FIG. 3 by a broken-line curve $E_1$ (coinciding in part with a solid-line wave form $E_3$). At each of the other two terminals 11, the same voltage wave form appears, the wave forms of the three terminals 11 having mutual phase differences of 120 degrees therebetween. Accordingly, if the operation of the regulating circuit with respect to the voltage $E_1$ of FIG. 3 is described, it will be possible to clarify the operation of whole regulating circuits.

In FIG. 3, the reference letter $E_2$ designates the voltage wave form at the junction 8 between the output circuit 7 (in the case wherein the said circuit 7 is of the type shown in FIG. 2A) and the saturable reactors 6. If the capacity of the condenser 16 which functions as the output circuit 7 is large, the voltage wave form $E_2$ will be nearly a straight line.

Subsequent to a time instand $t_1$, the input voltage $E_1$ becomes higher than the voltage $E_2$, and the rectifier 3 becomes conductive. However, since the saturable reactor is magnetized in an unsaturated condition by a method which will be described hereinafter, rectified current does not flow immediately because of its counter electromotive force. Accordingly, the voltage of the terminal 12 of the saturable reactor 6 becomes as indicated by $E_3$ shown by a solid line. After the rectified current has been suppressed by the required value under this condition, the saturable reactor reaches saturation at a time instant $t_2$. Accordingly, a rectified current $I_1$, as indicated by a solid line in FIG. 3, flows. (Broken line curves $I_{II}$ and $I_{III}$ indicate rectified currents of the other phases differing by 120 degrees of phase.)

Subsequent to a time instant $t_3$, since the input voltage becomes lower than the voltage $E_2$, the rectifier 3 assumes a cut-off condition, but the voltage $E_3$ at the terminal 12 of the saturable reactor is caused to follow the voltage $E_1$ by the resistor 5.

Subsequent to a time instant $t_4$, the rectifier 9 becomes conductive, and the voltage $E_3$ is clamped to the voltage $E_4$ of the regulation power source 13.

Subsequent to a time instant $t_5$, the input voltage $E_1$ assumes a higher electric potential than $E_4$; the rectifier 9 of the clamp circuit is cut off; the voltage $E_3$ follows up the voltage $E_1$; and a time instant $t_{1a}$ is reached. Thereafter, the same operation as that between the time instants $t_1$ and $t_{1a}$ is repeated.

It will be apparent from the foregoing description that the voltage imparted to the saturable reactor 6 is the difference between the voltages $E_2$ and $E_3$. The portion of the diagram which is shaded by oblique lines sloping downwardly to the right represents voltages for the purpose of demagnetizing the magnetic core of the saturable reactor from its saturated condition to the unsaturated condition. This voltage can be regulated by varying the regulation voltage $E_4$. The portion of the diagram which is shaded by oblique lines sloping upwardly to the right represents voltage by which the saturable reactor is suppressing the rectified current, and this condition continues until the core of the saturable reactor becomes saturated. The area of the portion shaded by oblique lines sloping downwardly to the right is equal to the area of the portion shaded by oblique lines sloping upwardly to the right, as will be apparent from the following equation, which represents the relation between the variation of the magnetic flux of the saturable reactor and the electromotive force.

$$\int e\,dt = 10^{-8} \cdot N \cdot \Delta\Phi \text{ volt-sec.}$$

where N is the number of winding turns of the coil of the saturable reactor, and $\Delta\Phi$ is the quantity of variation of the magnetic flux of the core during its variation from its unsaturated condition to its saturated condition or during the reverse variation.

Accordingly, by increasing or decreasing the regulation voltage $E_4$, it is possible to increase or to decrease, respectively, the flow angle of the rectified curernt.

It will be apparent that, since this operation is common to the voltage of all phases, as was described above, it is possible to regulate electrically the rectified output obtained from a three-phase alternating current voltage by means of the circuit arrangement indicated in FIG. 1. By means of this circuit arrangement, it is possible to regulate the rectified output voltage substantially from the peak value of the voltage $E_1$ to value near zero, even when the output current is in the vicinity of zero. Moreover, even if the voltage $E_4$ is near zero electric potential, the proportion of variation, in accordance with the variation of the voltage $E_4$, of the area of the portion shaded by oblique lines sloping downwardly to the right, does not become appreciably small. Consequently, the regulation sensitivity with respect to the variation of voltage of the power source 13 is greatly superior to these of conventional systems.

The foregoing disclosure has described the case wherein the circuit indicated in FIG. 2A is used as the output circuit 7. The case wherein the circuit of FIG. 2B is used will now be described below with reference to FIG. 4. In FIG. 4, the voltage wave form $E_1$ indicated by a broken line (coinciding in part with the wave form of voltage $E_3$ indicated by a solid line) is the same as the wave form shown in FIG. 3, but the voltage wave form at the junction point of the output circuit 7 and the saturable reactor 6 is caused, by the effect of the choke coil 17, to assume a wave form with a sharp trough as indicated by $E_2$. The voltage wave form $E_5$ of the other terminal 10 of the choke coil becomes a form which is substantially a straight line in the case wherein a smoothing condenser 16 is used. Accordingly, the voltage imparted to the choke coil 17 becomes the difference between the voltage wave forms of $E_2$ and $E_5$ which is indicated by the portions shaded in FIG. 4 by horizontal lines and vertical lines in the time interval from $t_2$ to time $t_3$, wherein the saturable reactor is saturated. It will be apparent that, at times other than the time interval from time $t_2$ to time $t_3$ as indicated in FIG. 4 (for example, the time interval from $t_3$ to $t_{2a}$), voltages (not shown) which are the same as the voltage $E_1$ but mutually differing in phase by 120 degrees are applied to rectifiers 3 respectively.

In view of the foregoing relationships, the voltage $E_5$ of the output terminal 10 should assume a value equal to the mean value of the voltage applied to the terminal 8 of the choke coil 17 also in the case of the present circuit arrangement, similarly as in a rectifying circuit of the ordinary choke input type. More specifically, the voltage $E_5$ of the output terminal 10 is determined so that the area of the portion in FIG. 4 shaded by horizontal lines becomes equal to the area of the portion shaded by vertical lines. As will be described hereinafter, since the voltage $E_5$ is selected to be of a value close to the direct-current voltage $E_4$, for regulation, this voltage $E_4$ may be varied in order to cause the output voltage $E_5$ to vary.

The relation between the voltages $E_4$ and $E_5$ will now be described. Referring to FIG. 4, the thick, solid line designated by $E_3$ is a wave form of the voltage at one terminal 12 of a saturable reactor 6. Since the voltage $E_3$ is equal to the voltage $E_2$ at the time instant $t_1$, the voltage impressed on the saturable reactor 6 is zero, and the saturable reactor is magnetized by this time in an unsaturated condition to a value required for a reason which will be described hereinafter. The time interval subsequent to the time instant $t_1$ and up to a time instant $t_2$ is that wherein the magnetic flux density of the saturable reactor is caused by the voltage difference between the voltages $E_3$ and $E_2$ to progress toward saturation. The voltage $E_3$ becomes equal to the voltage $E_4$ of the direct-current power source 13 for regulation in the time interval from $t_1$ to $t_a$, because the rectifier element 9 becomes conductive, then it follows the voltage $E_1$ in the time interval from $t_a$ to $t_2$, because the rectifier element 3 becomes conductive.

At the time instant $t_2$, since the saturable reactor 6 reaches saturation, it abruptly loses counter electromotive force, and voltage $E_3$ becomes equal to voltage $E_2$.

In the time interval from $t_2$ up to a time instant $t_3$, since the voltage $E_1$ is impressed directly on the choke coil 17 by way of the rectifier 3, a rectified current $I_1$ as indicated by a solid line in FIG. 4 flows. (Reference symbols $I_{II}$ and $I_{III}$ designating broken lines indicate the rectified currents of the other phases mutually differing in phase by 120 degrees.)

At the time $t_3$, a rectified current is supplied by an alternating-current voltage which, as has been described above, is of the same voltage as the voltage $E_1$ but is lagging in phase therefrom by 120 degrees. Accordingly, the voltage at the junction 8 varies abruptly as indicated by $E_2$ in FIG. 4. At this time, the voltage $E_3$ of the junction 12 similarly varies abruptly, but thereafter and up to a time instant $t_b$ the voltage $E_3$ is clamped to the voltage $E_4$ by the effect of the rectifying element 9, the resistor 5, and the direct-current power source 13 for regulation, which function as voltage regulating means.

The time interval from $t_2$ up to a time $t_{1a}$, as a whole is that during which the magnetic flux of the saturable reactor 6 is demagnetized from its saturation value to an unsaturated condition, this interval being represented in FIG. 4 by the portion shaded by oblique lines sloping downwardly to the right. However, during a portion of the interval, as indicated by the portion shaded by oblique lines sloping upwardly to the right, the magnetization is toward the saturated direction.

The time interval from $t_{1a}$ to $t_{2a}$ is that during which the magnetic flux of the saturable reactor reaches saturation, similarly as in the interval from $t_1$ to $t_2$. For a mathematical representation of the magnetic flux variation at this time, the equation used in connection with FIG. 3 for the relation between voltage and magnetic flux variation is similarly valid. Accordingly, the area of the portion shaded by oblique lines sloping downwardly to the right is equal to the area of the portion shaded by oblique lines sloping upwardly to the right. It is apparent from FIG. 4, therefore, that a constant relationship exists between the regulating voltage $E_4$ and the output voltage $E_5$. That is, since the mean value of the voltage wave form $E_2$ is equal to the voltage $E_5$, if the area of the portion, in the interval from $t_b$ up to $t_{2a}$, which is above the voltage $E_4$ and shaded by oblique lines sloping upwardly to the right is denoted by A, the following equation will be valid.

$$\int_{t_3}^{t_{2a}} (E_2 - E_4) dt = (E_5 - E_4) \frac{2T}{3} = A$$

where T is the period of the alternating-current voltage.

Since, as is apparent from FIG. 4, A is of considerably low value and the voltages $E_5$ and $E_4$ are substantially equal each other, it is possible to regulate the output voltage $E_5$ to the required value by suitably varying the voltage $E_4$.

FIG. 5 shows a circuit diagram for the case wherein the present invention is applied to a full-wave rectifier circuit of the polyphase bridge type for rectifying a three-phase A.C. delta connected transformer. Although this circuit is substantially the same as that shown in FIG. 1, a rectifying element 4 is connected between each output terminal 11 of the power transformer 2 and a common return line 10a (one of the output terminals 10) of the circuit shown, in the direction opposite to that of the rectifying element 3, as the circuit has no neutral point in its three-phase alternating-current source. Accordingly, the operation of the circuit shown in FIG. 5 becomes somewhat different from that of the circuit of FIG. 1.

Figure 6:
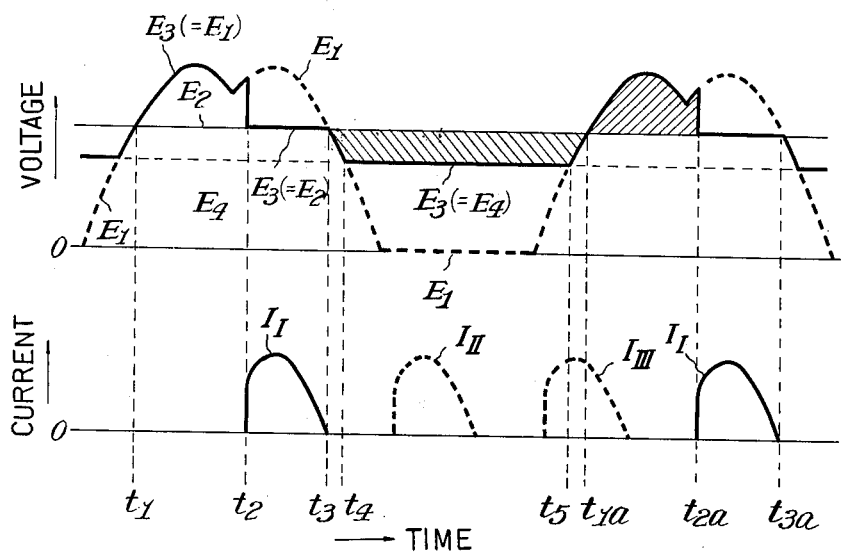
FIG. 6 is a wave form diagram for describing and illustrating the principles and operation of the embodiment shown in FIG. 5.

The operation of the circuit shown in FIG. 5 may be described as follows with reference to the voltage wave form diagram of FIG. 6. The rectifying circuit to be described here is generally known as a full-wave bridge circuit for rectifying a three-phase alternating current. The voltage of an output terminal 11 of the power transformer 2 which supplies voltage to one of the rectifying elements 3 is caused by the action of the corresponding rectifying elements 4 to take a voltage wave form $E_1$ as shown by a broken line in FIG. 6 (coinciding partly with $E_3$ shown by a heavy solid line). Since the voltage $E_2$ is that for the case wherein the circuit of FIG. 2A is used as the output circuit 7, its wave form is nearly a straight line.

In view of the nature of the circuit as described above, its operation can be described in substantially the same manner as was done in the case shown in FIG. 3. The point of difference is that it is not possible to make the voltage $E_4$ of the regulation power source 13 negative. Accordingly, when the output current is in the vicinity of zero, it is possible to regulate the rectified output voltage substantially from the peak value of the voltage $E_1$ to its mean value. The foregoing description relates to the case wherein the circuit of FIG. 2A is used as the output circuit 7, but the operation in the case wherein the circuit of FIG. 2B is used as the said circuit will be omitted here since it may be described in almost the same manner as in the description of the circuit of FIG. 1 by means of FIG. 4.

Figure 7:
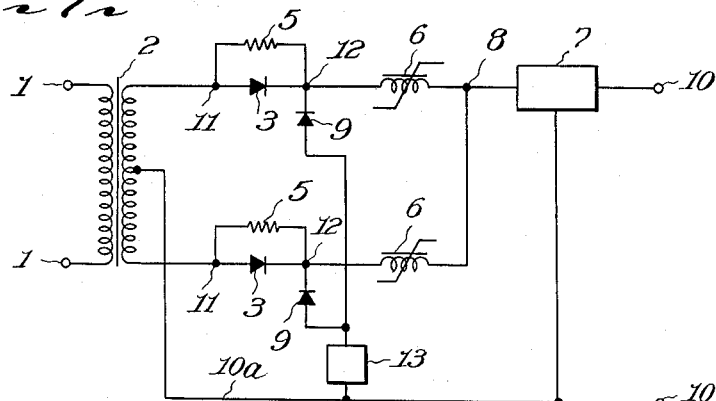
FIGS. 7 and 8 are schematics illustrating other embodiments of the invention.

FIG. 7 illustrates an example of the application of the present invention to a full-wave circuit, for a single phase A.C. supplied from a transformer having a neutral point. Since the operation in this case is almost the same as that of the circuit shown in FIG. 1, it may be described similarly with reference to FIG. 3 or FIG. 4, which illustrate the operation of the circuit shown in FIG. 1. However, since the point of difference is that the voltage being handled is a two-phase alternating-current voltage, the voltage wave forms of $E_1$ drawn in FIG. 3 are imparted to their respective rectifiers 3 with a mutual phase difference of 180 degrees.

Figure 8:
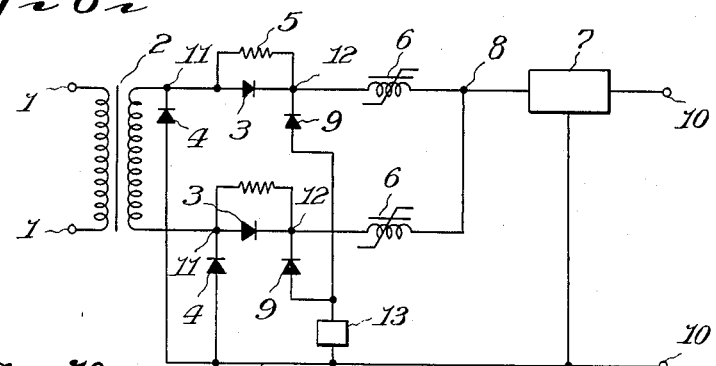

FIG. 8 illustrated an example of a case wherein the present invention is applied to a full-wave bridge circuit for rectifying a single-phase A.C. Since the operation of this circuit, which is illustrated by the voltage wave form diagram shown in FIG. 9, is almost the same as the operation of the circuit shown in FIG. 5, it may be described similarly as in the case of FIG. 6, which illustrates the operation of the circuit of FIG. 5.

It is an advantage of the invention that, since the power source 13 used for the voltage clamp circuits indicated in FIGS. 1, 5, 7 and 8 may be a voltage source of low capacity capable of supplying the magnetizing current of the saturable reactor 6 in each case, it is possible to utilize the output voltage of a direct current source employing a circuit element such as a vacuum tube or transistor.

In the case wherein the voltage clamp circuit composed of the resistor 5, rectifying element 9, and regulation power source 13 is used, the present invention has an advantage in that, even if the current in the inverse direction of the rectifier 3 is greater than the magnetizing current of the saturable reactor, the regulation performance is not impaired, and it is not necessary, therefore, to use a rectifier having a particularly low inverse current character as the rectifier 3. Moreover, in the case wherein the inverse current of the rectifier 3 is greater than the magnetizing current of the saturable reactor, the resistor 5 connected in parallel with the rectifier 3 may be omitted.

Figure 10:
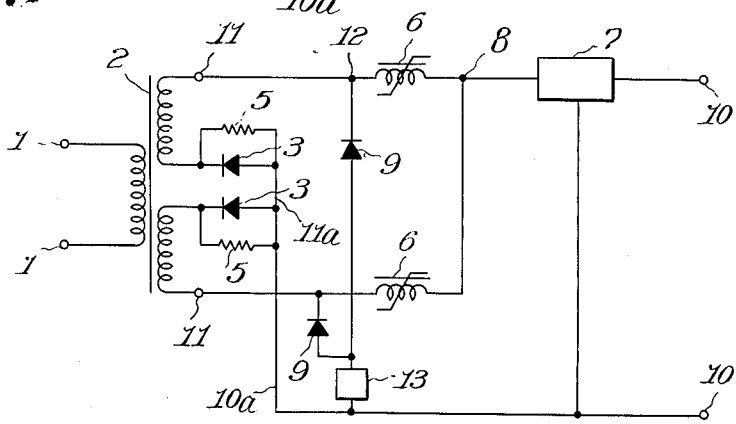
FIG. 10 is a schematic illustrating another embodiment of the invention.

A further modified embodiment of the invention is shown in FIG. 10. For the polyphase alternating-current rectifying means in this circuit, one terminal of each phase secondary winding of a power transformer 2 is connected by way of a rectifying element 3 to a common return line 10a, and to each of the other terminals 11 of the said phase windings a saturable reactor 6 is connected.

The operation of the circuit shown in FIG. 10 is exactly the same as those of the circuits described hereinbefore. During the interval in which an inverse voltage is impressed on each rectifying element 3, the corresponding saturable reactor 6 is magnetized to the necessary value, and the magnetizing current at this time is caused to flow by a resistor 5 connected in parallel with the rectifying element 3. Accordingly, the operation of this circuit may be described in exactly the same manner as in the case illustrated in FIG. 7.

Since it is obvious that many changes and modifications can be made in the above-described details without departing from the nature and spirit of the invention, it is to be understood that the invention is not to be limited to the details described herein except as set forth in the appended claims.

What we claim is:

1. A rectifying apparatus for obtaining a regulable direct current output from an alternating current comprising an alternating current source having a plurality of output terminals, rectifying means connected to said alternating current source for rectifying the output of said source comprising a plurality of series-connected circuits equal in number to the number of output terminals of said alternating-current source, each of said circuits comprising a rectifier, a resistor connected in parallel with said rectifier and a saturable reactor having a winding, connections connecting said winding of each saturable reactor to a common point, each of said rectifiers having a terminal connected in the same polarity to a respective output terminal of said alternating current source, regulating means comprising a regulative direct current voltage source, a plurality of rectifying elements connected to said direct current voltage source, connections connecting each of the rectifying elements to a respective junction between a rectifier and a respective saturable reactor and connecting said rectifiers and said rectifying elements in the same sense to each other, thereby to vary the voltage of the output of said regulative direct current source, and a smoothing circuit connected between said common point of the saturable reactors and said direct current voltage source.

2. A rectifying apparatus for obtaining a regulable direct current output from an alternating current, comprising a power supply transformer having at least one primary winding and at least one secondary winding having a neutral point and alternating current output terminals, rectifying means coupled to said transformer comprising a plurality of series connected circuits equal in number to the output terminals of said power supply transformer, each circuit comprising a rectifier, a resistor connected in parallel with said rectifier and a saturable reactor having a winding, connections connecting said winding of each saturable reactor to a common junction, each of said rectifiers having a terminal connected in the same polarity to a respective output terminal of said power supply transformer, regulating means comprising a regulative direct current voltage source having a variable direct current voltage output, a plurality of rectifying elements connected to said direct current voltage source, connections connecting each of said rectifying elements to a respective connection junction between a rectifier and a respective saturable reactor connecting said rectifiers and said rectifying elements in the same sense to each other, connections connecting each of said rectifying elements to said direct current voltage source which produces said variable direct current voltage output thereby varying the voltage of said regulable direct current output, a smoothing circuit connected between said common junction of the saturable reactors and said direct current voltage source, and a common return connected to said neutral point of the secondary winding of the power supply transformer, said direct current voltage source and said smoothing circuit.

3. A rectifying apparatus for obtaining a regulable direct current output from an alternating current, comprising a power supply transformer having at least one primary winding and at least one secondary winding having a neutral point and alternating current output terminals, rectifying means coupled to said transformer comprising a plurality of series connected circuits equal in number to the output terminals of said power supply transformer, each circuit comprising a rectifier, a resistor connected in parallel with said rectifier and a saturable reactor having a winding, connections connecting said winding of each saturable reactor to a common junction, each of said rectifiers having a terminal connected in the same polarity to a respective output terminal of said power supply transformer, regulating means comprising a regulative direct current voltage source having a variable direct current voltage output, a plurality of rectifying elements connected to said direct current voltage source in a full-wave bridge rectifier circuit configuration, connections connecting each of said rectifying elements to a respective connection junction between a rectifier and a respective saturable reactor and connecting said rectifiers and said rectifying elements in the same sense to each other, connections connecting each of said rectifying elements to said direct current voltage source which produces said variable direct current voltage output thereby varying the voltage of said regulable direct current output, a smoothing circuit connected between said common junction of the saturable reactors and said direct current voltage source, and a common return connected to said neutral point of the secondary winding of the power supply transformer, said direct current voltage source and said smoothing circuit.

4. A rectifying apparatus for obtaining a regulable direct current ouput from an alternating current comprising, a power supply transformer having at least one primary winding and at least one secondary winding having a neutral point and alternating current output terminals, rectifying means coupled to said transformer comprising a plurality of series connected circuits equal in number to the output terminals of said power supply transformer, each circuit comprising a rectifier, a resistor connected in parallel with said rectifier and a saturable reactor having a winding, connections connecting said winding of each saturable reactor to a common junction, each of said rectifiers having a terminal connected in the same polarity to a respective output terminal of said power supply transformer, regulating means comprising a regulative direct current voltage source having a variable direct current voltage output, a plurality of rectifying elements connected to said direct current voltage source, connections connecting each of said rectifying elements to a respective connection junction between a rectifier and a respective saturable reactor connecting said rectifiers and said rectifying elements in the same sense to each other, connections connecting each of said rectifying elements to a common connection on said direct current voltage source which produces said variable direct current voltage output thereby varying the voltage of said regulable direct current output, a smoothing circuit connected between said common junction of the saturable reactors and said direct current voltage source, and a common return connected to said neutral point of the secondary winding of the power supply transformer, said direct current voltage source and said smoothing circuit.

References Cited by the Examiner

UNITED STATES PATENTS

| 2,896,147 | 7/1959 | Huge | 321—16 |
| 2,978,628 | 4/1961 | Diebold | 321—25 |

FOREIGN PATENTS 1,112,349  11/1955  France.

LLOYD McCOLLUM, *Primary Examiner.*

SAMUEL BERNSTEIN, *Examiner.*